Figure 1:
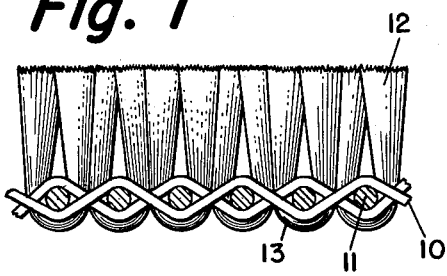

Nov. 6, 1962  W. L. BRYAN  3,062,379
ION EXCHANGE FABRICS
Filed Nov. 5, 1959  2 Sheets-Sheet 1

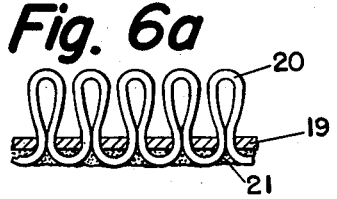
Fig. 6a
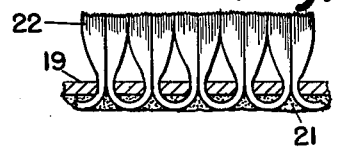
Fig. 6b
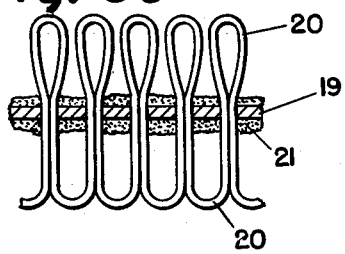
Fig. 6c
Fig. 6d
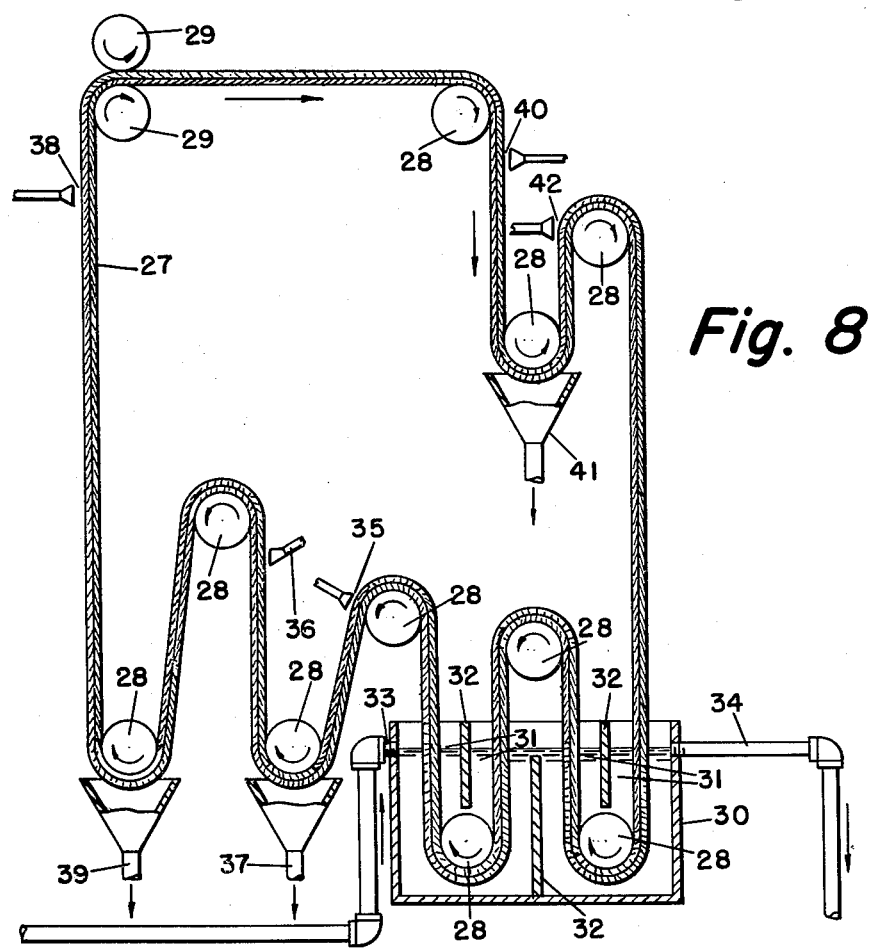
Fig. 8

United States Patent Office 3,062,379
Patented Nov. 6, 1962

3,062,379
ION EXCHANGE FABRICS
William L. Bryan, Huntsville, Ala., assignor to Rohm & Haas Company, Philadelphia, Pa., a corporation of Delaware
Filed Nov. 5, 1959, Ser. No. 851,056
2 Claims. (Cl. 210—499)

This invention concerns structures or fiber products fabricated from fibers which exhibit ion exchange properties, in which structures or fiber products the ion exchange fibers are in pile or tufted form. The water-insoluble fibers which exhibit ion exchange properties are hereinafter referred to as "ion exchange fibers." More particularly, it concerns fabricated ion exchange fiber constructions in which constructions relatively short sections of ion exchange fibers are attached to a supporting base, said supporting base being composed in whole or in major part of water-insoluble materials which do not exhibit ion exchange properties.

It is known in the prior art that certain naturally-occurring materials exhibit finite ion exchange properties, among these materials being fibers such as wool, cotton, and silk. While, from an academic viewpoint, they do possess "finite ion exchange capacities," the capacities are so low as to be completely valueless for use in ion exchange processes. Wool, for instance, has an exchange capacity of only 0.8 meq. per gram (dry), and the capacities of the other fibers of naturally-occurring materials are of the same order of magnitude. On the other hand, chemically-treated cotton, such as phosphorylated cotton, prepared by the treatment of cotton with phosphoric acid, will exhibit exchange capacities in the range of 2 to 3.5 meq. per gram (dry), and it is generally considered that a material must exhibit an exchange capacity of at least 2 meq. per gram (dry) before it can be used with any degree of success in ion exchange processes. More commonly used ion exchange materials have capacities from about 3 to about 12 meq. per gram (dry). Many of the commercially available ion exchange materials are in the range of 4.5 to 10.0. Thus, it can be seen that the untreated fibers from naturally-occurring materials do not compare at all on the basis of ion exchange capacity and are valueless for use in ion exchange processes.

It is also known in the prior art that natural fibers may be so chemically altered or reacted that they exhibit ion exchange properties. Furthermore, it is known that such fibers, exhibiting ion exchange properties, can be used in woven form and applied in ion exchange processes as continuous lengths of fabrics or, as more commonly designated, belts. As set forth in the prior art, these belts may be employed in continuous ion exchange processes, being cycled through exhaustion, rinsing, regenerating, and rinsing steps, and, hence, to the exhaustion step again. While offering several advantages over ion exchange processes employing granular ion exchangers, these continuous processes employing woven belts of ion exchange fibers do have definite disadvantages. In common with most ion exchange materials, ion exchange fibers exhibit changes in dimensions when converted from one ionic form to another. Said dimensional changes introduce serious complications when the ion exchange fibers are employed in continuous belt devices. The alternate longitudinal and lateral contraction and expansion requires the use of compensating devices in order to maintain the necessary essentially constan tension in the belt.

The strength of ion exchange resin fibers, particularly when wet, as contrasted to the strength of other fibers commonly used in the manufacture of fabrics, is relatively low, and, while small belts woven from said ion exchange resin fibers may have sufficient strength to permit the use of laboratory or pilot plant assemblies, scale up to larger units frequently presents serious problems.

Furthermore, with the woven fabrics of ion exchange resin fibers, it is necessary to force the fluid to be treated through the fabric in order to effect sufficiently rapid and complete ion exchange. This necessity for exerting physical forces on the fabric in order to obtain effective ion exchange reaction rates results in abrasion of the fibers and eventual breaking of the fabric itself. When employed in continuous belt devices, such breakages necessitate shutdown and repair of or replacement of the belt.

It is desirable in large scale continuous ion exchange belt processes to have as high an ion exchange capacity per unit of belt area as is possible. In other words, as thick a fabric as is possible is most desirable. It is not feasible to make a plain weave fabric of any appreciable thickness because of restrictions on the size of yarn (i.e., diameter of the yarn) which may reasonably be woven. This is particularly true when considering ion exchange fabrics because of the lower strength of ion exchange fibers and the necessity of achieving efficient contact between the solution and the fiber such as would be obtained by forcing the fluid to be treated through the fabrics in order to obtain effective ion exchange. Another factor particularly pertinent in the case of ion exchange fabrics is that the rate of exchange decreases as the diameter of the ion exchange fiber increases, and it is desired to retain the very fast rates of exchange of the very small diameter ion exchange fibers.

An object of this invention is to provide a means for obtaining ion exchange fibers in the form of ion exchange fiber constructions which are substantially without longitudinal or lateral dimensional changes when the ion exchange fibers are converted from one ionic form to another.

A further object of this invention is to provide a form of ion exchange fiber fabric which exhibits exceptionally high tensile strength, particularly when compared with the tensile strengths of fabrics which contain ion exchange resin fibers alone.

A further object of this invention is to provide ion exchange fibers in fabric form, said fabric forms exhibiting high abrasion resistance.

A further object of this invention is to provide a means of obtaining ion exchange resin fiber constructions in a form which makes possible high exchange rates.

Another object of this invention is to provide ion exchange structures which have very high specific surface.

A further object of this invention is to provide ion exchange structures with high ion exchange capacity per unit area, which structures maintain the fibers under substantially no tension in a form in which said fibers are readily accessible for ion exchange reactions.

It has been found that the disadvantages of the prior art fiber constructions can be overcome if an ion exchange fiber structure is employed in which relatively short lengths of ion exchange fibers are attached to a supporting base, hereinafter also referred to as a support or backing. Substantially, the entire length of the fiber is free, i.e. only a minor portion of the entire length is attached to the supporting base. Numerous basically different types of constructions are embraced by this invention, but there is one feature common to all the constructions. They all employ relatively short lengths of ion exchange fibers embedded or attached to a base or backing which is dimensionally stable under the conditions encountered in ion exchange reactions.

One such type of construction is represented by pile fabrics in which the pile portion is composed of ion exchange fibers, alone or in combinations with fibers which do not exhibit ion exchange properties, said fibers which do not exhibit ion exchange properties being present in varying proportions depending on the physical properties desired in the pile.

Within the scope of the present invention are pile fabrics of a variety of types in which the pile may consist of ion exchange fibers or ion exchange fibers in combination with fibers which do not exhibit ion exchange properties, and the backing may consist of porous or non-porous films, or woven, braided, knitted, or knotted fabrics or screens, which fabrics or screens may consist solely of fibers which do not exhibit ion exchange properties or of mixtures of such fibers and fibers exhibiting ion exchange properties. The backing may also be a non-woven fabric which may consist of fibers which do not exhibit ion exchange properties alone, or in admixture with ion exchange fibers.

The ion exchange fiber structures of the present invention can be fabricated either from fibers which exhibit ion exchange properties or from fibers which can be converted to fibers with ion exchange properties when the fabrication into the structures has been completed. It is frequently true that the ion exchange form of some of these fibers is lower in strength than the fiber prior to conversion, and, when this is the case, the preferred method consists in fabrication and then subsequent conversion to the ion exchange form.

The methods employed for the manufacture of such pile fabrics are numerous and constitute those well-known in the rug, carpet and mohair fabric industry's prior art. Many of these methods are set forth in detail in "Fiber to Fabric," page 280 et seq. (Potter, The Gregg Publishing Company, New York, 1945). A more recent article entitled "10 Ways to Knit Pile Fabrics" appears in "Textile World" (McGraw-Hill, 330 North 42nd Street, New York 36, New York), page 66 et seq., September issue, 1958. The information in the cited section of "Fiber to Fabric" and in the "Textile World" article is incorporated herein by reference.

The ion exchange resin fiber pile fabrics of the present invention can be manufactured in a variety of forms, but the constructions have one feature in common. The structures are substantially water-insoluble and all components thereof must be since they are designed for long periods of use in aqueous media. They may be prepared by adhering or inserting or weaving water-insoluble ion exchange fibers alone or admixed with fibers which do not exhibit ion exchange properties, into a water-insoluble base or backing consisting of materials which do not exhibit ion exchange properties, or a mixture of materials which do not exhibit ion exchange properties in combination with varying amounts of ion exchange fibers. They may also be prepared by substituting a fiber for the ion exchange fiber which substituted fiber can be converted to an ion exchange fiber after fabrication.

When a woven base is used, the choice of fibers for said base will depend on numerous factors, particularly on the conditions which will be encountered in the ion exchange reactions to which the ion exchange fabric will be subjected. It is true, however, that most ion exchange processes treat solutions which would normally be considered to be dilute. Thus, 5.0% (50,000 p.p.m.) or even higher total ionizable solids content would be considered to be an upper limit for practically all ion exchange applications. Actually, 1.0% (10,000 p.p.m.) would be a much more commonly encountered maximum. Thus, considering that the maximum acid or base concentration would not exceed about 1.0% to about 5.0%, the choice of the fiber for the woven base is much less limited than it might appear to be. Furthermore, most ion exchange reactions are conducted at room temperature or, at most, only slightly elevated temperatures, so that the aggressive attack on any fiber is still further decreased. For alkaline media, cotton and rayon fibers can be used. Coarser fibers, such as jute or sisal, may also be used in alkaline media. Wool and Dacron, a condensation product of ethylene glycol and terephthalic acid, are suitable for use in acid media. Nylon, a condensation product of hexamethylene diamine and adipic acid, and Orlon, a polyacrylonitrile fiber, are suitable for use in both acid and alkaline media and are preferred fibers for the woven base. Acrilan, also a polymer of acrylonitrile, Dynel, a copolymer of acrylonitrile and vinyl chloride, saran, a vinylidene chloride-vinyl chloride copolymer, and Vicara, a fiber derived from corn protein, are also very satisfactory under substantially all the conditions encountered in ion exchange processes. Verel, a modified acrylic fiber, and Teflon, a tetrafluoroethylene polymer may also be satisfactorily employed. Polyethylene fibers, polypropylene fibers or fibers of poly(trifluorochloroethylene) may also be employed. Other water-insoluble fibers, such as glass fibers, may be similarly employed. Under some conditions, it may be advantageous to employ mixtures of these fibers in the woven base. As set forth hereinbefore, these fibers, or mixtures of these fibers, may be used in admixture with ion exchange fibers.

Screens may also be used as the base for such tufted ion exchange fiber constructions. Thus, the ion exchange fibers can be woven into or otherwise attached to fine mesh screens of stainless steel or Monel. Nickel screens may also be used successfully, as may be screens woven from poly(vinyl chloride) or poly(vinylidene chloride) fibers. Many of the fibers set forth in the preceding paragraph may also be used in the fabrication of screen-like bases.

Water-insoluble plastic films may also be used as the base for tufted ion exchange fiber constructions and suede-like tufted products can be made by applying an adhesive to one or both sides of a sheet of polyethylene, nylon, poly(vinyl chloride), poly(vinylidene chloride), Mylar, etc., and affixing the ion exchange fibers to such coated films by electrostatic methods well-known to those skilled in the art. When employing such substantially water-impervious films, the ion exchange processes to be conducted are carried out by permitting the solution to be treated to flow down through the ion exchange fibers adhering to the outside of the plastic film.

The water-insoluble ion exchange resin fibers may be any of a number of chemical compositions, which contain groups capable of exchanging ions with ions of other compounds. Typical of such groups are carboxylic, sulfonic, phosphonic, amine, quaternary ammonium, mercaptan, enolate, and phenolic. The ion exchange resin fiber can contain more than one type of exchange group.

In general, it is preferred that all of the ion exchange fibers comprising the pile portion of the pile fabric be composed of ion exchange compositions, but the presence of fibers in the pile which exhibit no ion exchange properties may be desired to obtain certain desirable physical properties, such as, for instance, increased abrasion resistance. Examples of fibers or filaments composed of ion exchange materials, either of the cation or anion type, are disclosed and claimed in a copending application Serial Number 587,925, filed May 29, 1956, now Patent No. 2,933,460, and the subject matter of that application is incorporated herein by reference.

Besides using such fibers which are formed entirely of ion exchange material, there may be used instead fibers or filaments of either artificial or natural character which have been coated with ion exchange materials or have had a superficial treatment imparting ion exchange groups to the chemical structure at the surface of the fiber or filaments or fibers may be formed of cotton, wool, silk, linen, wood pulp, nylon, casein, or of vinyl or acrylic resins such as from homopolymers and copolymers of vinyl chloride, vinyl acetate, acrylonitrile, ethylene, propylene, vinylidene chloride, methyl and ethyl esters of acrylic acid and methacrylic acid, as well as cellulose esters and ethers, such as cellulose acetate, ethyl cellulose, etc. Such fibers and filaments may be rendered capable of exchanging ions by impregnation with monomers comprising monomers having ion exchange groups of any of the types mentioned hereinbefore and, if desired, with diethylenically unsaturated monomers and then effecting polymerization thereof by the use of conventional initiators, promoters, accelerators, and the like. Alternatively, a linear polymer containing ion exchange groups may be coated on the surface of such fibers or filaments, if desired, along with a diethylenically unsaturated monomer and in the later case further polymerization of the ion exchange material with the monomer may be effected to render the coating insoluble and infusible. Alternatively, instead of coating the fibers with ion exchange materials, the molecules of the fiber, whether natural or synthetic, may be reacted with compounds adapted to introduce ion exchange groups into the fiber molecules. For example, cotton or regenerated fibers or filaments may be reacted with acrylonitrile to cyanoethylate the cellulose molecules followed by hydrolysis to introduce carboxylic acid groups. Alternatively, the cellulose molecule may be reacted with 2-chloroethyldiethylamine to introduce amino groups into the molecules of the fiber.

Alternatively, fibers with ion exchange properties can be prepared by extruding a fiber-forming polymer, which polymer has had finely divided ion exchange resins, either of the cation or anion type, incorporated therein prior to extrusion. Thus, a polymer, such as polyethylene, nylon, etc., can be milled or otherwise masticated with a finely divided cation exchange resin of the sulfonic acid type and subsequently extruded in fiber form. A weak base anion exchanger, or a quaternary anion exchanger can be similarly incorporated. If a fiber with weakly acidic properties is desired, a carboxylic type cation exchange resin can be employed.

Figure 2:
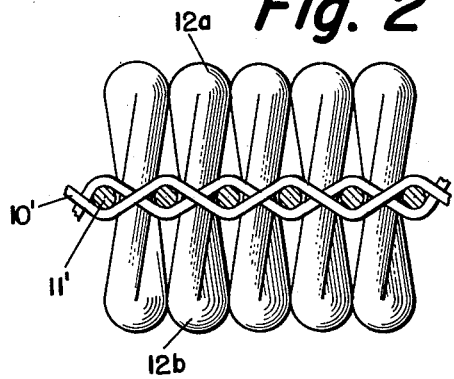

FIGURES 1 and 2 show a schematic view of a longitudinal cross section of two similar types of ion exchange pile fabrics. Ten (10) represents the warp fiber and 11 represents the weft or fill yarns comprising the woven fabric base. These may be any of the natural or synthetic fibers or mixtures thereof, as hereinbefore set forth, or mixtures of natural or synthetic fibers with ion exchange fibers. Bunches of ion exchange fibers which have been anchored by weaving into woven fabric base are represented by 12. The tufts of ion exchange fabrics may be open at the top as shown in FIGURE 1 or they may be closed loops, 12a or 12b, as shown in FIGURE 2. The fabric may be tufted on one side, as shown in FIGURE 1, or may be tufted on both sides as shown in FIGURE 2. If tufted on only one side, as shown in FIGURE 1, then the tufts or pile may be additionally anchored by applying an anchoring binder or coat to the back surface of the fabric 13. This sizing or back-filling operation is well-known in the art, and is frequently employed in the manufacture of rugs, carpets, and mohair fabrics. However, while water-sensitive or even water-soluble anchoring coats may be employed in the aforementioned industries, they must be avoided in the present invention. Furthermore, the permissible anchoring coats must be resistant to dilute acid and alkali of the concentrations hereinbefore set forth. Thus, a variety of latices can be employed such as natural rubber latex, GR-S latices, Buna N latices and neoprene latices. They are preferably vulcanized, but may be used in the unvulcanized form. Similarly, a wide variety of resinous compositions can be employed. Nitrocellulose, ethyl cellulose, or cellulose acetate lacquers can be used. Synthetic resin dispersions, such as vinyl chloride, suitably plasticized, acrylic dispersions, etc., may also be used.

Figure 3:
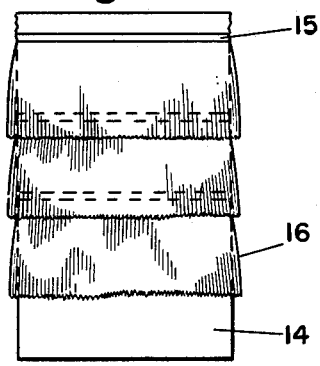
Figure 4:
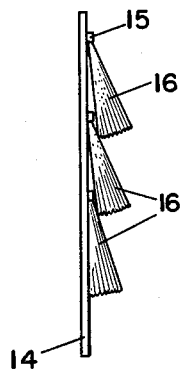

FIGURES 3 and 4 show, schematically, two views of a different type of pile fabric. The woven fabric base is represented by 14, and 15 represents means of attaching the ion exchange fibers 16, to the woven fabric base. As shown, the tufts of fibers overlap slightly so that when held in a substantially vertical position, liquid flowed onto the top of such fabric can flow downwards and be in contact with the ion exchange fibers at all times.

Figure 5:
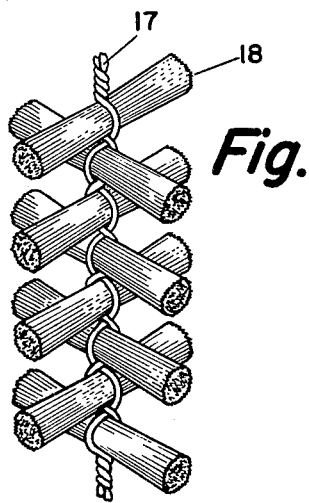

FIGURE 5 shows the "brush" or "bottle brush" type of construction. Seventeen (17) represents the backing or supporting material which may be a rigid material, such as stainless steel wire, or a flexible material such as a nylon monofilament. The bundles of ion exchange fibers 18, are interlocked in the twisted backing, and any given bundle may be at any angle to the bundle above or below it.

The supporting base may consist of rope-like structures to which the ion exchange fibers are attached at substantially an angle of 90° to the longitudinal axis of said rope-like structure. The rope-like structure can be prepared by twisting, braiding, or otherwise combining a series of strands of a variety of materials. Thus, there may be used stainless steel or nickel wires or wires of any of the corrosion-resistant metals or alloys of varying degrees of flexibility. There may also be used any of the fibers set forth hereinbefore, alone, or in admixture with one another. Thus can be produced a circular brush-like structure which may be employed for ion exchange as a pendant column, or may be employed in continuous lengths.

FIGURE 6 shows, schematically, four different types of tufted fabrics, the tufts or loops being composed of ion exchange fibers and the backing being composed of inert fibers as hereinbefore set forth. FIGURE 6(a) is a sectional view of a fabric with loops on one side only. Nineteen (19) is the inert backing; 20 is the uncut loop of ion exchange fibers; and 21 is a binder which may be necessary to hold the ion exchange fibers in place. FIGURE 6(b) is a sectional view of a tufted fabric in which the loops of ion exchange fibers have been cut. Twenty-two (22) is the bundle of fibers which result from cutting the loops. FIGURES 6(c) and 6(d) are, respectively, sectional views of fabrics, tufted on both sides, (c) showing uncut loops, and (d) showing a similar construction with cut loops.

The length of the ion exchange fibers employed for the tufts can be varied appreciably, depending on the physical characteristics of the ion exchange fibers and the specific ion exchange process for which the ion exchange structures of the present invention are to be employed. Thus, they can be from about 0.25 inch to about 12 inches in length.

The fiber density, i.e. the number of fibers per unit area of the supporting base may be varied widely, again depending on the physical properties of the fibers and the intended use of the structure. It is desirable to get as high a fiber density as possible, the upper limit being that density which prohibits intimate and rapid contact between the individual fibers and the solution to be treated.

The ion exchange pile fabrics which are one embodiment of this invention offer many advantages not previously available. Because these fabrics are not dependent on the ion exchange fibers for their mechanical strength, much higher tensile and tear strengths are possible and woven bases exhibiting much higher abrasion resistance can be made. Obviously, these improved physical properties improve the mechanical handling properties of the fabrics. Because the woven base controls the dimensions of the fabric, and because it contains at least some fibers which do not exhibit ion exchange properties, there are substantially no dimensional changes when the fabric is employed in ion exchange processes. Thus, if the pile fabrics of the present invention are fashioned into a belt and employed in continuous ion exchange devices, the belt, once correctly adjusted, will remain in adjustment both longitudinally and laterally for prolonged periods. This overcomes the problems encountered when using a belt consisting solely of ion exchange fibers which can expand or contract as much as 25 percent both longitudinally and laterally when converted from one ionic form to another. The markedly improved abrasion resistance of the woven fabric base is of particular value when the fabric is employed as a belt in a continuous ion exchange device. Practically all such devices employ mechanical guides, idlers and some type of squeeze rolls to propel the belt. As set forth hereinbefore, belts consisting solely of ion exchange fibers exhibit relatively low abrasion resistance, gradually fraying, and finally breaking.

Because the ion exchange fibers in pile fabric form have very high specific surface and because they extend substantially from the woven base, it is not necessary to force the solution through the belt. Furthermore, because of said high specific surface, ion exchange rates are very high.

Because of the high tensile strength which said pile fabrics exhibit, there are essentially no limitations on the size of the fabrics which can be woven. This enables scale up to commercial size. This higher tensile strength becomes particularly important when employing pendant methods of operation or filter type applications as hereinafter set forth.

When cross-linked copolymer type of ion exchange resin fibers are employed in the construction of the structures of the present invention, then one additional distinct advantage accrues. It is known that the physical and chemical resistance of cross-linked ion exchange copolymers increases as the degree of cross-linking increases. It is also known, however, that the rate of exchange, regeneration efficiency, and other required ion exchange properties are adversely affected by increased degree of cross-linking. Because of the very high exchange rates of the structures of the present invention, it is possible to employ ion exchange resin fibers with substantially higher degrees of cross-linking and still retain entirely satisfactory ion exchange properties. As set forth hereinbefore, this permits employing ion exchange resin fibers with high physical and chemical resistance to degradation.

The ion exchange fabrics may be employed as continuous belts in a variety of continuous ion exchange devices. Said fabrics may also be used as filter cloths in a variety of filtering devices, thus permitting filtration and ion exchange to occur simultaneously. Thus, they may be employed as filter cloths in plate and frame type filters, or in Sweetland or Kelly filters. They are employed particularly advantageously as filter cloths for rotary drum filters. When so employed, not only is filtration continuous, but the ion exchange reaction can also be made continuous by relatively simple expedients obvious to those skilled in the art.

Figure 7:
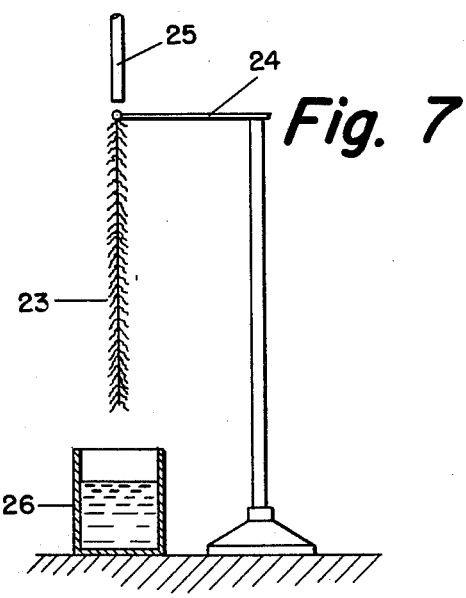

Said structures may also be employed as pendant "columns" by securing the top of a long section of fabric and permitting the length of fabric to hang in a substantially vertical position. The solution to be treated is fed to the top of the length of fabric, flows by gravity down the length of fabric, thus permitting ion exchange to take place. The untreated solution is collected at the bottom of the "column." FIGURE 7 represents a schematic description of such a column. The section of pile fabric, 23, is pendant from means 24, and 25 is means for applying the liquid to be treated. 26 represents means for collecting treated liquid, i.e. effluent from the "column." When compared with ion exchange processes employing granular ion exchangers, this method of operation offers many advantages. In the first place, high rates of flow are possible because of the high exchange rate which the pile fabrics exhibit. Furthermore, such fabric "columns" are self-cleaning in that any solids present in the fluid being treated are not entrapped as in a granular ion exchange bed, but are washed down between or on the surface of the fibers. The rinse requirements of these fiber columns are also low since there is very little holdup of the solution being treated in the fabric. Viscous solutions can be treated with these fabric columns and no headloss difficulties are encountered.

It is not necessary to use a flexible or semi-flexible material for the backing or as the supporting base. Thus, brush type structures can be prepared in which the ion exchange fibers are imbedded or otherwise affixed to a rigid backing, such as wood or plastic, or even metal. Structures of the brush type are of particular importance when the ion exchange fibers are relatively rigid or firm. The supporting base may also be in the form of cylinders with the ion exchange fibers being attached to the curved cylindrical surface. Such cylindrical "brushes" may be fitted with means for rotation, and two such brushes, one having cation exchange fibers and the other having anion exchange fibers, can be arranged in such a fashion that they intermesh. Solutions poured over the intermeshed area are then deionized without at any time being subjected to extremes of pH.

It is possible to effect continuous deionization without subjecting the solution being treated to extremes of pH by having two moving belts with pile on one side only, one of which has an anion exchange fiber pile, the other of which has a cation exchange fiber pile. The belts, both in the regenerated state, are maintained in contact with one another for a portion of their length and the solution to be treated is applied to the section in which the two belts are in contact. This contact section may be in a vertical position in which case the solution to be treated is allowed to flow down between the belts, or the contact section may be moved horizontally through a container, which contains the solution to be treated. In the areas of the belts which are not in contact, the belts may be rinsed, regenerated, and rinsed separately and then again brought into contact with each other.

FIGURE 8 illustrates how an endless pile-type ion exchange fiber belt can be used as a continuous ion exchanger in which the following types of contact between fiber and liquid are attained: (1) continuous countercurrent contact with an open hanging belt, (2) continuous co-current contact with an opening hanging belt, and (3) continuous countercurrent contact with a belt immersed in the solution. The apparatus shown is especially feasible for a series of exchange reactions in which a double regeneration is necessary, such as with a carboxylic ion exchange belt used for recovery of polyvalent cations such as copper or nickel from dilute, essentially neutral, solutions. For such a series of reactions, the following equations may be written (the equation numbers correspond to those above):

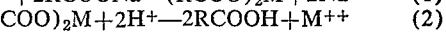

$$M^{++} + 2RCOONa \rightarrow (RCOO)_2M + 2Na^+ \quad (1)$$
$$(RCOO)_2M + 2H^+ \rightarrow 2RCOOH + M^{++} \quad (2)$$
$$2RCOOH + 2NaOH \rightarrow 2RCOONa + 2H_2O \quad (3)$$

Notes:
(a) $M^{++}$ is a divalent metal ion such as copper or nickel
(b) RCOOH is the acid form of a carboxylic ion exchange resin fiber
(c) RCOONa is the sodium form of a carboxylic ion exchange resin fiber
(d) $(RCOO)_2M$ is the divalent metal salt form of a carboxylic ion exchange resin fiber The various components of the apparatus are identified as follows: the endless, pile-type ion exchange belt, 27, prepared by sewing two-inch lengths of carboxylic ion exchange fibers on a woven nylon backing as shown in FIGURE 3, is supported by a series of idler rollers, 28, and is caused to move at any of several different rates of travel by means of squeeze rollers, 29, which are driven by a motor (not shown). In the second phase of regeneration of the belt (sodium hydroxide solution), the belt passes through a tank, 30, which is open at the top and which is divided into compartments 31, by means of partitions 32. The partitions are so arranged that the sodium hydroxide regenerant solution, which enters the tank at 33 and leaves at 34 and which flows by gravity through the tank, contacts the belt countercurrently in each compartment of the tank. After leaving the tank, the sodium form belt passes over a series of idler rollers 28. At these rollers, the belt is sprayed with rinse water at 35 and at 36 which trickles down the open belt sections to a collecting means 37. The rinse water admitted at point 36 flows co-currently with the belt, while the rinse water at point 36 flows countercurrently to the belt. The rinsed sodium-form belt passes upward in the exhausting section countercurrently to the incoming dilute solution of polyvalent metal ions, which is fed to the contactor at 38. The metal ions in the dilute feed solution are exchanged for sodium on the belt, so that essentially all the polyvalent cations are removed from the solution, as it trickles down the belt and is collected in means 39. The speed of the belt is adjusted so that the desired degree of saturation of the fibers is achieved, by the time a particular section of belt has traveled from the bottom of the exhausting section to means 29 for expressing solution from the belt at the top. The belt bearing the recovered polyvalent metal is cycled to the primary regeneration section, where sulfuric acid is fed onto the belt at 40. The acid trickles co-currently with the belt in this section to the collecting means 41. The concentration of sulfuric acid used is generally much higher than the original concentration of the dilute polyvalent metal feed stream at 38, so that the effluent at 41 contains a more concentrated solution of metal than the original solution. Sulfuric acid concentrations of about 1% to 10% are satisfactory. The regeneration is effective with co-current flow of acid regenerant with the belt, because a carboxylic ion exchanger has a greater affinity for hydrogen ions than for polyvalent metal ions. The belt is rinsed by countercurrent flow at 42, which rinses excess acid and free metal ions from the belt into the collecting means 41. After rinsing, the belt, which is in the hydrogen form, completes the cycle by entering the sodium hydroxide tank 30 for neutralization of the hydrogen form and conversion to the sodium form.

PREPARATION OF ION EXCHANGE FIBERS

I. Ion Exchange Fibers

A. 100-filament yarn was prepared by spinning of an aqueous dispersion consisting of a terpolymer of 65% acrylonitrile, 20% methoxymethyl vinyl sulfide and 15% butylcellosolve acrylate according to the method of Bibolet et al. (as set forth in U.S. application Serial No. 532,789, filed September 6, 1955 now Patent No. 2,914,376, and assigned to the same assignee as the present invention). The fiber was cross-linked by the method described by Richter (as set forth in U.S. application Serial No. 587,925, filed May 29, 1956 and assigned to the same assignee as the present invention) and converted to a carboxylic (weakly acidic) ion exchange fiber by immersion in a boiling mixture of NaOH, $C_2H_5OH$ and water to cause partial hydrolysis of the ester and nitrile groups. The capacity of the fiber was 6–7 milliequivalents per gram of dry fiber in the hydrogen form.

B. Fibers spun and cross-linked as in Preparation I–A above and of essentially the same composition were heated in a mixture of mineral oil and dimethylaminopropylamine at 115°–170°/20 hours. The ratios of reactants were 27 moles of amine per mole of fiber in a 1:1 mixture of amine to oil by weight. The resultant fibers after washing had a weak base capacity of 5.3 meq./g., a wet tenacity of 0.8 g./denier and a moisture regain of 7.0% at 75% R.H. in the free base form. They consisted essentially of cross-linked polymer chains comprising units of dimethylaminopropylacrylamide.

C. The amine fibers of Preparation I–B were converted to strong-base, quaternary amine fibers by reaction with dimethyl sulfate in alcohol. The capacity of the fibers was 2.5 meq./g.

D. In a fashion similar to that of Preparation I–C, the amine fibers of I–B were quaternized with methyl chloride by heating in an autoclave at 70 lb./sq. in. at 45° C. for 30 hours. The resultant fibers had a strong-base capacity of 2.2 meq./g.

E. 20-filament yarn was prepared by melt spinning of a copolymer consisting of 80% styrene and 20% butadiene. The fibers were cross-linked by treatment with concentrated sulfuric acid and sulfonated with chlorosulfonic acid to yield a strongly acidic ion exchange fiber with a capacity of 4.5–5.0 milliequivalents per gram of dry fiber in the hydrogen form after hydrolysis.

F. 500-filament yarn was prepared by wet spinning of an aqueous dispersion of a copolymer consisting of 85% styrene and 15% butadiene. The fibers were cross-linked by treatment with aluminum chloride in nitromethane and chloromethylated by treatment with a mixture of chloromethyl ether, aluminum chloride and ethylene dichloride. The fibers were converted to the strongly basic quaternary ion exchange form by amination of the chloromethyl groups with trimethylamine. A capacity of 3–3.5 meq./g. of dry fiber in the hydroxide form was obtained.

G. A yarn of multi-filament polyvinyl alcohol fibers stabilized with formaldehyde was used as a substrate. The fibers were reacted in succession with the ethyl acetal of bromoacetaldehyde, with sulfuric acid and sodium sulfate and with sodium sulfide to bring about cross-linking. The fibers were then converted to the strongly acidic sulfonic ion exchange form with sodium sulfate by the method described by Motozato, J. Chem. Soc. Japan, Ind. Chem. Sect. 59, 109–11 (1956). An ion exchange capacity of 1.5–2.5 milliequivalents per gram of fiber in the dry hydrogen form was realized.

H. Poly(vinylalcohol) fibers were treated with phosphorous oxychloride in chloroform as described by Motozato, Kogyo-Kagaku Zasshi 59, 479–82 (1956) (Japanese) to give dibasic phosphoric acid fibers of 1.5–3.0 meq./g. capacity.

I. Long staple cotton yarn was converted to a phosphate ester acid by the method described by Jurgens, Textile Research Journal 18, 42 (1948). The method was modified by pretreatment of the yarn with 20% NaOH before phosphorylation. The resultant fibers had a capacity of 3.5–3.7 meq./g.

J. A mixture of finely ground sulfonated styrene-divinylbenzene polymer containing 15% of divinylbenzene and having a cation capacity of 4.5 meq./g. and polyethylene pellets was heated to 180° C., kneaded in a mixer, and pelletized to ¼" pellets. The pellets were fed to a screw extruder, and the melt was spun through a 40 hole die. The resultant fibers were heat stretched to yield flexible filaments with a cation exchange capacity of approximately 2 meq./g.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

A pile-type ion exchange fabric with a 7⁄16 inch depth pile of carboxylic ion exchange fibers on a nylon fabric backing was prepared by tufting, as described below:

A 100-filament yarn was prepared by dispersion spinning of a dispersion copolymer according to the method of Bibolet et al. (as set forth in U.S. patent application Serial No. 532,789, filed September 6, 1955 and assigned to the same assignee as the present invention. The dispersion copolymer was prepared from the following monomer mixture: 65% acrylonitrile, 20% methoxymethyl vinyl sulfide and 15% butylcellosolve acrylate. The resulting yarn was cross-linked by treatment with alcoholic iodine solution followed by heating at 150° for 2 hours, as described by Richter (as set forth in U.S. patent application Serial No. 587,925, filed May 29, 1956 and assigned to the same assignee as the present invention.

A 12-ply yarn was prepared by plying the 100-filament yarn described above and twisting (1.1 twists per inch). This heavier yarn was used to prepare a tufted fabric by means of a conventional rug-tufting machine. The tufted fabric consisted of loops of the 12-ply yarn on a nylon backing ribbon. The backing ribbon was cm. selvaged, nylon, medium-weight grosgrain. Eight colums of tufts, 7⁄16 inch pile length, were punched to 0.5 cm. centers both as to rows and columns to give a tuft density of 4/sq. cm. The tufted belt was backed with a vulcanizable natural rubber latex and heat cured. The belt was then heated in an aqueous-alcoholic (1:3 by volume) solution (60 ml./g. of fiber of sodium hydroxide (0.32 g. per g. of fiber) for 24 hours at reflux to hydrolyze the cross-linked nitrile-ester fibers. The resultant fibers had a capacity of 6.43 meq./g. (sampled by cutting from belt). The belt had a capacity of 31.8 meq./running foot. The nylon ribbon edges were hemmed to give an overall width of 5 cm.

EXAMPLE II

A belt similar to the belt as set forth in Example I was constructed except that after backing with rubber the tufts were cut at the center of each loop and the belt then subjected to conversion of nitrile and ester groups to carboxyl groups.

EXAMPLE III

A belt similar to the belt as set forth in Example I was constructed except that the length of pile was ¼ inch.

EXAMPLE IV

In a similar fashion 12-ply fiber as described above was skeined and hydrolyzed as indicated in Example I. The fiber was rinsed and dried and wound onto bobbins. A belt was tufted in a construction similar to that of Example I and backed with latex.

EXAMPLE V

Tows of 100-filament yarn of initial composition as described in Example I were hydrolyzed to 6 meq./g. carboxylic capacity. Approximately 116 rows of carboxylic yarn were laid uniformly along a 2 inch wide nylon belt and the yarn sewn to the backing through a ¼ inch nylon strip placed across the width of the yarn. The tow was raised across the belt to a height of 3 inches and a second fill section sewn at a 0.5 inch distance from the first. This process was repeated to give a looped construction of 3 inch loops sewn to backing through nylon strips at 0.5 inch intervals. The carboxylic capacity was 130 meq./ft.

EXAMPLE VI

In a similar fashion, a 2 inch loop construction was prepared with 1¾ inch spacing so that a ¼ inch overlap of pile occurred.

EXAMPLE VII

Two belts similar to that of Example VI were sewn back to back to give a 2-sided construction.

EXAMPLE VIII

Stiff saran screening, 1/16 inch mesh, was overlaid with carboxylic fiber in tow form and the form was sewn to the screening at 2 inch intervals by placing nylon strips under the screen and under and above the exchange fiber in parallel form across the width. This construction provided a firm backing for the fill which was supplied by sewing with nylon thread.

EXAMPLE IX

The construction of Example VI was repeated in several variations. In one the loops were cut evenly. In another the loops were cut so that the under side was shorter and fitted between the fill spacers. In a third this was reversed to give overlapping bottom fringes and shorter top fringes.

EXAMPLE X

An open fabric was constructed in the following manner from 400 denier yarn of the composition described in Preparation I–A prior to hydrolysis. A ribbon 2 inches in width comprising 280 warp ends with ¼ inch fill sections spaced 7 inches apart was made on a ribbon loom. This fabric was hydrolyzed as described in Preparation I–A and used to prepare a looped belt by sewing the fill sections to nylon belt. One such construction was made with fill sewn to the backing every inch. A second construction was made with fill sewn every 2 inches; the loops were left as is, cut evenly or cut to provide fringe of even length.

EXAMPLE XI

A construction similar to that of Example X was made using glass fabric as backing.

EXAMPLE XII

A construction similar to that of Example X was made using a khaki twill as backing material.

EXAMPLE XIII

The construction of Example VII was repeated and the belt encased in a fine nylon mesh (⅛ inch mesh), sewn loosely to allow expansion of the looped belt with liquid, and tacked every 6 inches to give dimensional stability.

EXAMPLE XIV

A 1/16 inch mesh saran screen was overlaid with 12 ply twisted carboxylic fiber such that the fibers were placed across the long direction of the belt to be fabricated. A nylon binding was used to fasten one edge, binding each yarn at its end to the saran screen edge. The fibers were lifted towards the seam to give a 1 inch high loop and another nylon strip sewn 3 inches from the first. This gave on cutting a 3 inch wide belt section with loops 3 inches wide, 1 inch high (at centers) tacked perpendicularly to the length of the belt. A number of such constructions were joined to give belts of the desired lengths.

EXAMPLE XV

The construction of Example XIV was repeated using Teflon tape as backing.

EXAMPLE XVI

The construction of Example XIV was repeated using a nylon tape as backing and placing two belts back to back to give a two-sided ladder-like looped construction.

EXAMPLE XVII

A tufted belt similar to that of Example I but constructed of sulfonic fibers having a dry capacity of 3.5 meq./g. was used to treat a natural water of 150 p.p.m. total hardness (as $CaCO_3$). A 2-foot wide belt having a capacity of 400 meq./ft. and moving at 5 ft./min. would treat 14,000 gal./day. The effluent water contains less than 20 p.p.m. of total hardness.

EXAMPLE XVIII

The performance of two belts of similar capacity and identical exchange functionality (carboxylic) were compared for exchange performance. Each belt was fed 700 gal./day in a continuous system. The influent concentration was 0.02 N NaOH and the exhaustion contact length required to give in each case a steady-state effluent concentration of 0.0002 N (1% breakthrough) was determined. Belt A was a tufted belt fabricated essentially as described in Example I. It had a capacity of 80 meq./ft. for a 0.5 ft. width. Belt B was a selvaged plain weave belt (30 ends per inch, 20 picks per inch) composed entirely of ion exchange carboxylic fibers of the same type as the tufts in Belt A. Belt B had a capacity of 80 meq./ft. and was 0.5 ft. wide. A 26-ft. contact zone was required for Belt A as compared to a 60-ft. contact zone for Belt B to give in each case a 0.0002 N effluent.

Using an auxiliary rotating roller covered with a urethane foam and operating in such fashion as to fluff the tufts of Belt A as it entered the contact zone, it was found possible to reduce the contact zone to 13 ft. and achieve the same quality of effluent water.

EXAMPLE XIX

Using the tufted belt of Example I, a partially clarified and purified batch of fermentation broth containing streptomycin was fed as the pregnant solution to the exhaustion stage of the continuous exchange unit. Regeneration was accomplished in a three-stage system involving 0.5

NHCl, rinsing, and 0.5 N NaOH. The resin capacity was in excess of 1 g. of streptomycin per dry gram of carboxylic fiber. The operation was marked by ability to use high flow rates and by freedom from fouling by trapped solids. The solids content of the fermentation broth was smoothly and continuously flushed down the belt during operation.

EXAMPLE XX

A 40-foot long belt prepared as described in Example V and having a carboxylic cation exchange capacity of 80 meq./ft. was placed in operation in a three-stage continuous exchange system. In the first stage, 0.02 N NaOH was employed as a feed to the hydrogen-form belt. The belt was passed through a squeeze-roll into a regenerant zone using 0.2 N $H_2SO_4$ as regenerant to convert the sodium form to hydrogen. This was followed by a rinse section and the belt was then recycled through the exhaustion area. A typical set of run conditions are shown below:

| | |
|---|---|
| Alkali Feed Rate | 1800 ml./min. |
| Exhaustion Contact Zone | 4 feet. |
| Belt Rate | 1 ft./min. |
| Regenerant Rate | 200 ml./min. |
| Rinse Rate | 80 ml./min. |
| Effluent Concentration | 0.006 N NaOH (sulfate free). |

In other runs the alkali concentration was varied from 0.001 N to 2.0 N. The belt rate was varied from 0.5 feet/min. to 25 feet/min. The flow rate was changed from 50 ml./min. at the higher concentrations to 4 liters/min. at the lower concentrations. The exhaustion contact zone was varied from 2 feet to 10 feet. In some runs the belt was run in the exhaustion cycle at an incline from the vertical of 20° to 40°. This inclination effected an improvement in performance, all other conditions being the same.

Using an influent concentration of alkali of 0.2 N NaOH and a belt rate of 10 feet/min., the effluent concentration was reduced to 0.12 N. Another run using an influent concentration of 0.002 N NaOH and a belt rate of 1 foot/min. gave an effluent concentration of 0.0005 N NaOH.

Using a similar belt but having the fringe spaced so as to have no overlapping, a feed of 0.02 N NaOH at 1800 ml./min. gave an effluent concentration of 0.001 N NaOH.

EXAMPLE XXI

A belt of plain weave construction having a carboxylic cation exchange capacity of 80 meq./ft. of cation exchange capacity as carboxylic groups was substituted for the belt of Example XX and the same exchange, regeneration and rinse cycles were operated. Under these conditions, a 15% increase in belt length occurred during the cycle requiring the use of floating rollers to maintain uniform belt tension. The steady state effluent using 0.02 N NaOH as feed at 1800 ml./min. was 0.01 N NaOH. Continuous use produced wear in the belt that led to rupture in a short period of time.

EXAMPLE XXII

The rates of exchange of several one foot lengths of belts constructed with carboxylic ion exchange fibers prepared as in Preparation I-A were determined by supporting the belts vertically and feeding dilute aqueous solutions of sodium hydroxide of 0.08% concentration to the hydrogen-form exchanger belts at a rate of 900 ml./min. The effluent streams which trickled down the open belt sections were sampled periodically at definite time intervals for analysis.

During the exchange rate tests, the first amounts of effluent liquids were observed to be substantially free of sodium hydroxide (concentration was less than 0.01%). As feeding continued, the concentration of the effluent stream increased continuously, as the ion exchange fiber became neutralized. From the concentrations of the samples of effluent during the neutralization, the rates of neutralization of the hydrogen form carboxylic fiber were calculated and may be represented semi-quantitatively as the time required for one-half the fiber capacity to be fully neutralized. This time may be referred to as the time for 50% neutralization of the belt section. In order to find the effect of tension on the belt during neutralization, the tests were repeated, first with a one-pound weight attached to the bottom of each belt sample, and then with a two-pound weight attached similarly.

For comparison, a loose tow of parallel yarns of carboxylic fiber, a two-inch width belt of plain weave construction with the same fiber and a tufted belt formed as described in Example I with loops cut were tested in the manner described above. All these materials had 130–140 meq. of usable carboxylic capacity and were 1 foot long in the hydrogen form. The results of all the tests are tabulated below:

| External tension on 1-foot belt | Time for 50% conversion, minutes | | |
|---|---|---|---|
| | Loose tow | Pile-type fabrics | Plain weave belt |
| None | 1.9 | 2.0-2.2 | 3.5. |
| One pound | 3.4 | 2.0-2.2 | 4.1. |
| Two pounds | Parted | 2.0-2.2 | Parted. |

The exchange rates of the pile-type belts under no tension were substantially higher (shorter time) than for the belt of plain weave construction and only slightly lower than that of the loose tow. While the rates of neutralization of the pile-type fabrics were unaffected by external tension, the rates of the other structures were substantially reduced under one pound of tension and the other structures were broken under two pound tension, because of the lower tensile strength of the sodium-form fibers.

Thus, the pile-type fabric combines the inherent fast rate of the ion exchange fiber alone with dimensional stability and constancy of rate under tension, properties which are required in moving systems.

EXAMPLE XXIII

The rates of exchange of the several 1-foot lengths of belts described in Example XXII were also determined with the sections fully immersed in 7 liters of 0.4% sodium hydroxide (0.1 N). The hydrogen-form belts were held at the top and bottom in a vertical position and the liquid was vigorously agitated. In order to measure the rate of neutralization of the carboxylic fiber, samples of the liquid were periodically withdrawn for analysis. As before, the time for 50% conversion of the fiber was determined. The tests were repeated, first under one pound of tension, and then under two pounds of tension. The results of these tests appear in the following table:

| External tension on 1-foot belt | Time for 50% conversion, minutes | |
|---|---|---|
| | Pile-type fabrics | Plain weave belt |
| None | 0.7-1.1 | 2.4. |
| One pound | 0.7-1.1 | 3.1. |
| Two pounds | 0.7-1.1 | Parted. |

It is seen that in a completely immersed contact the rates of exchange of the pile-type belts were unaffected by the external tension. Not only is the rate of exchange less with a belt of plain weave construction, but the rate decreased even more with tension, and the belt broke, as before, under two pounds of tension.

EXAMPLE XXIV

A belt as set forth in Example VI was prepared using sulfonic fiber of 2.0 meq./g. capacity and non-overlapping fringes. A similar belt was prepared using the fibers of Preparation I-D. These belts were used in the contactor exhaustion zone in such a manner as to provide a Monobed. This was accomplished by feeding both belts pile-sides facing. The belts were separated at the end of the exhaustion cycle to provide separate regeneration. With this system hard water was continually deionized to give water with resistance of $1 \times 10^6$ ohms.

EXAMPLE XXV

Using a pile fabric belt composed of carboxylic fibers and a second belt of quaternary amine fibers similar to those of Preparation I-D, a continuous Monobed unit was operated to decolorize and deash raw sugar. The pile-type fabrics allowed high space yields, low solids holdup and efficient purification.

I claim:

1. A structure which exhibits ion exchange properties comprising (1) a water-insoluble supporting base, said supporting base being a woven fabric composed of at least a major proportion of water-insoluble materials which do not exhibit ion exchange properties, and (2) a plurality of water-insoluble aggregates of synthetic ion exchange fibers having ion exchange groups, said fibers being firmly attached to the supporting base, each of said ion exchange fibers being anchored at spaced intervals to said supporting base and other portions projecting from said anchored intervals.

2. A structure as set forth in claim 1 in which said supporting base consists of at least one fiber selected from the group consisting of cotton, linen, rayon, jute, sisal, wool, glass, polyester fibers, polyamide fibers, polyacrylate fibers, polyacrylonitrile fibers, poly(vinyl chloride) fibers, poly(vinylidene chloride) fibers, polyalkylene fibers and synthetic proteinaceous fibers.

References Cited in the file of this patent

UNITED STATES PATENTS 2,974,101    Richter _____ Mar. 7, 1961

OTHER REFERENCES

Muendel et al.: "Continuous Ion Exchange With an Endless Belt of Phosphorylated Cotton," Industrial & Engineering Chemistry, vol. 47, No. 3, pp. 374–379 (pp. 374, 375 and 378 are of special interest).

Gunthrie et al.: "Ion Exchange Cottons," Industrial & Engineering Chemistry, vol. 42. No. 9, pp. 2187–2188.

Hiester et al.: "Ion Exchange," Chemical Engineering, vol. 61, No. 10, pp. 161–175 (page 173 is of special interest).